Patented Sept. 9, 1952

2,610,181

UNITED STATES PATENT OFFICE 2,610,181

SERIES OF NITROFURAN COMPOUNDS COMPRISING THE AZOMETHINES OF 5-NITRO-2-ACYL FURANS WITH 1-AMINO-HYDANTOINS

Kenyon J. Hayes, Norwich, N. Y., assignor to Eaton Laboratories, Inc., Norwich, N. Y., a corporation of New York No Drawing. Application May 29, 1950, Serial No. 165,095

6 Claims. (Cl. 260—240)

This invention relates to a new series of chemotherapeutically effective nitrofurans, which have proved of special value because they show a great resistance to metabolic destruction. This series includes a number of closely related nitrofuran compounds described by the generic name, azomethines of 5-nitro-2-acylfurans with 1-aminohydantoins.

They are represented by the general formula:

$$O_2N\text{-furan-}C(R)=N-N(R')-C(R''H)-C(=O)-N-R' \text{ (with X=O or S on ring C)}$$

in which:

X represents O or S
R represents hydrogen or lower alkyl ($C_1$–$C_4$)
R' represents hydrogen or lower alkyl ($C_1$–$C_6$)
R'' represents hydrogen or lower alkyl ($C_1$–$C_6$)

and in which:

R+R'' contain not more than 6 carbon atoms, and
R+R'+R'' contain not more than 6 carbon atoms.

I have discovered that the exceptional resistance to breakdown by the bodily processes shown by members of this series allows excretion in the urine of dosed animals which is highly antibacterial. This, in conjunction with chemotherapeutically effective blood levels, makes these members especially useful in the treatment of many urinary tract infections. Chemotherapeutic effects are attainable at less than toxic doses. These members are very effective antibacterial agents against *Staph. aureus* and *Strep. hemo.*, as well as against *E. coli*, *S. faecalis* and *P. vulgaris*, which are of particular concern in many urinary tract infections.

The various members of this new series of drugs differ from each other somewhat in degree of chemotherapeutic effectiveness. This is due, in part, to resultant differences in physical properties such as water solubility and oil/water distribution ratios.

Of the series, I now prefer a particular member, N-(5-nitro-2-furfurylidene)-1-amino-hydantoin. This is a relatively stable, yellow solid, which is readily prepared by well-known reactions.

In general the 1-amino-hydantoins are prepared by condensation of α-hydrazino-aliphatic carboxylic acids or their esters with cyanic acid, thiocyanic acid or alkyl isocyanates or alkyl mustard oils, followed by cyclization of the resultant α-(2-semicarbazido)-aliphatic carboxylic acids or esters, which may be effected by heat with or without acid as catalyst. The 1-amino-hydantoins thus obtained may be isolated or condensed directly with 5-nitro-2-furaldehyde, 5-nitro-2-furyl methyl ketone etc. in neutral or moderately acid media. The 5-nitro-2-furaldehyde may also be generated directly in an acid meida containing the 1-amino-hydantoin as by hydrolysis of 5-nitro-2-furaldehyde diacetate.

In order that this invention may be fully disclosed to those skilled in the art, methods for preparing a number of these new compounds are described briefly:

EXAMPLE 1

*N-(5-nitro-2-furfurylidene)-1-amino-hydantoin*

$$O_2N\text{-furan-}CH=N-N(\text{CO-NH-CO-CH}_2)\text{ (hydantoin ring)}$$

A solution of approximately 0.5 gram mole 1-amino-hydantoin sulfate in an aqueous solution (7 liters) containing approximately 8% acetic acid and containing approximately 12% sulfuric acid was prepared essentially by the method of Traube and Hoffa (Ber. 31, 167 (1898)).

To this was added a ten percent molal excess of 5-nitro-2-furaldehyde diacetate and about 10 volume percent of ethanol. The mixture was stirred and heated at approximately 85° C. for one-half hour, then cooled to 10° C. to yield orange-yellow needles of N-(5-nitro-2-furfurylidene)-1-amino-hydantoin. The material was well washed with water and alcohol. This material melts with decomposition at 251–253° C. uncorr. An aqeuous solution absorbs in the ultraviolet at 3700 Å.

$$E_{1\%}^{1\,cm.} = 710$$

EXAMPLE 2

*N-(5-nitro-2-furfurylidene)-1-amino-5-methylhydantoin*

$$O_2N\text{-furan-}CH=N-N(\text{CO-NH-CO-CH(CH}_3\text{)})\text{ (hydantoin ring)}$$

1-amino-5-methylhydantoin sulfate was prepared by the method of Bailey and Mikeska (J. A. C. S. 38, 1782 (1916)). To 2.13 gms. in 100 cc. of 1:1 ethanol-water was added 4.5 gms. of 5-nitro-2-furaldehyde. After heating and stirring for one-half hour the yellow solid was filtered, washed with ethanol and dried in vacuo. Quantitative yield. M. P. 218-9° C. dec. uncorr.

This absorbs in the ultra-violet at 3675 Å., $$E_{1\%}^{1cm}=631$$

EXAMPLE 3

N-(5-nitro-2-furylacetylidene)-1-amino-5-methylhydantoin

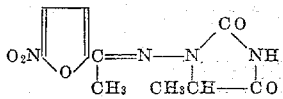

1-amino-5-methylhydantoin sulfate, prepared by the method of Bailey and Mikeska (J. A. C. S. 38, 1782 (1916)), was dissolved in water, buffered with sodium acetate and treated with a small excess of 5-nitro-2-furyl methyl ketone dissolved in an equal volume of alcohol. After some hours a fine precipitate of yellow needles was filtered, washed with water and alcohol and dried. M. P. 200-201° C. uncorr.

EXAMPLE 4

N-(5-nitro-2-furfurylidene)-1-amino-2-thiohydantoin

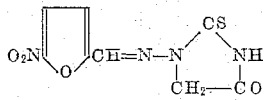

To an efficiently agitated suspension of 20 gms. of ethyl hydrazinoacetate hydrochloride in 140 cc. of glacial acetic acid are added 19.3 gms. of potassium thiocyanate in small portions over a period of two hours at a temperature of 27° C. After this addition period the reaction mixture is stirred at 28° C. for 3½ hours and then filtered to remove insoluble salts. The clear filtrate is concentrated to a pasty mass by distillation under a pressure of 20 mm. Hg. Finally the residue is heated for 12 minutes at 120° C. under vacuum. 9.34 gms. of crude ethyl-2-thiosemicarbazido-acetate of M. P. 121-127° C. can be isolated by recrystallizing this material from 50 cc. of water.

8 gms. of the thiosemicarbazido intermediate are then refluxed with 100 cc. of water for 3 hours. Crude 1-amino-2-thiohydantoin precipitates on cooling the solution; recrystallization from ethanol yields 2.4 gms. of the thiohydantoin which melts completely at about 191° C.

The addition of 2.7 gms. of 5-nitro-2-furaldehyde to 2.4 gms. of the thiohydantoin compound in 200 cc. of hot ethanol yields approximately 4.4 gms. of N-(5-nitro-2-furfurylidene)-1-amino-2-thiohydantoin. The pure nitrofuran melts with final decomposition at 225° C.

EXAMPLE 5

N-(5-nitro-2-furfurylidene)-1-amino-3-methyl-2-thiohydantoin

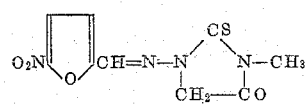

About 0.43 gm. of N-(5-nitro-2-furfurylidene)-1-amino-3-methyl-2-thiohydantoin may be prepared by the addition of 0.32 gm. of 5-nitro-2-furaldehyde to 0.32 gm. of 1-amino-3-methyl-2-thiohydantoin (made by the method of Traube and Hoffa, Ber. 31:169) in 7 cc. of warm 95% ethanol. The pure nitrofuran melts with final decomposition at 218° C.

EXAMPLE 6

N-(5-nitro-2-furfurylidene)-1-amino-5-n-butylhydantoin

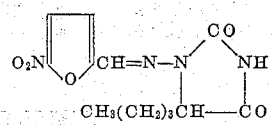

To a well stirred suspension of 13 grams of benzylidene-α-hydrazino caproic acid, prepared by the method of H. Berger (J. prak. Chem. 152, 309 (1939)), in 217 cc. of glacial acetic acid are added 5.7 grams of potassium cyanate, in small portions, during the course of three-quarters of an hour. The temperature is maintained at 20-30° C. during the addition and for approximately three hours thereafter. Treatment with 60 cc. of benzene and 1200 cc. of water causes the precipitation of slightly impure benzylidene-2-semicarbazidocaproic acid of M. P. 160-165° C., yield 8.4 grams.

Eight grams of the crude benzylidene-2-semicarbazidocaproic acid are suspended in 85 cc. of water containing 14 cc. of concentrated sulfuric acid and subjected to steam-distillation to remove the benzaldehyde and to cyclize the semicarbazido acid to the 1-amino-hydantoin derivative. The resulting solution is clarified, and the volume adjusted to 340 cc. by the addition of water. A solution of 3.74 grams of 5-nitro-2-furaldehyde in 8 cc. of 95% ethanol is then added and the resulting mixture is stirred about one-half hour at room temperature to complete the reaction. The yellow product is filtered, washed and dried. Yield 5.7 grams; M. P. 175.5-176.5° C.

What is claimed is:

1. A compound having chemotherapeutic activity and resistance to metabolic destruction and represented by the formula:

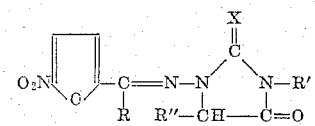

in which:

X represents a member of the group consisting of O and S

R represents a member of the group consisting of hydrogen and a lower alkyl radical containing from 1 to 4 carbon atoms R' represents a member of the group consisting of hydrogen and a lower alkyl radical containing from 1 to 6 carbon atoms R'' represents a member of the group consisting of hydrogen and a lower alkyl radical containing from 1 to 6 carbon atoms and in which:

R+R'' contain not more than 6 carbon atoms, and

R+R'+R'' contain not more than 6 carbon atoms.

2. N-(5-nitro-2-furfurylidene)-1-amino-hydantoin represented by the formula:

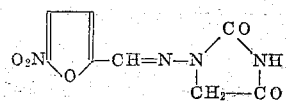

3. N-(5-nitro-2-furfurylidene)-1-amino-5-methyl-hydantoin represented by the formula:

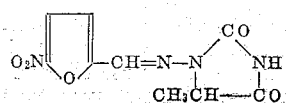

4. N-(5-nitro-2-furylacetylidene) - 1 - amino-5-methylhydantoin represented by the formula:
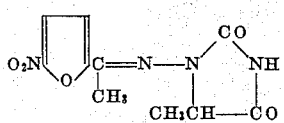
5. N-(5-nitro-2-furfurylidene) - 1 - amino - 2-thiohydantoin represented by the formula:
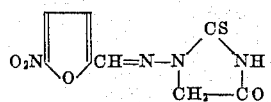
6. N-(5-nitro-2-furfurylidene) - 1 - amino -3 - methyl-2-thiohydantoin represented by the formula:
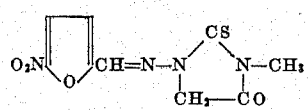
KENYON J. HAYES.
No references cited.